(12) United States Patent  (10) Patent No.: US 7,451,692 B2
Baraille et al.  (45) Date of Patent: Nov. 18, 2008

(54) APPLIANCE FOR COOKING FOODS UNDER PRESSURE COMPRISING A TEMPERATURE SENSOR

(75) Inventors: Eric Laurent Baraille, Dijon (FR); Michel Pierre Cartigny, Mirebeau sur Beze (FR); Thierry Rene Gailhard, Chaponnay (FR)

(73) Assignee: SEB S.A., Ecully Cedex (FR)

( * ) Notice: Subject to any disclaimer, the term of this patent is extended or adjusted under 35 U.S.C. 154(b) by 389 days.

(21) Appl. No.: 10/500,163

(22) PCT Filed: Dec. 23, 2002

(86) PCT No.: PCT/FR02/04534

§ 371 (c)(1), (2), (4) Date: Oct. 8, 2004

(87) PCT Pub. No.: WO03/055365

PCT Pub. Date: Jul. 10, 2003

(65) Prior Publication Data

US 2005/0028678 A1  Feb. 10, 2005

(30) Foreign Application Priority Data

Dec. 27, 2001  (FR)  .................................. 01 17101

(51) Int. Cl.
*A47J 37/00* (2006.01)
*A47J 27/00* (2006.01)
*A23L 1/00* (2006.01)

(52) U.S. Cl. ............... 99/332; 99/325; 99/331; 219/440; 219/492; 426/523; 426/510

(58) Field of Classification Search ................. 219/439, 219/440, 438, 430, 431, 621, 625, 492; 99/330, 99/331, 325, 332; 426/233, 520, 523, 509, 426/510, 438, 243
See application file for complete search history.

(56) References Cited

U.S. PATENT DOCUMENTS 5,567,458 A * 10/1996 Wu ............................. 426/233
5,571,476 A * 11/1996 Newman ....................... 422/26
6,070,518 A * 6/2000 Kao ............................. 99/332
6,083,543 A   7/2000 Kim et al. .................... 426/231

FOREIGN PATENT DOCUMENTS

| EP | 0434047 | 6/1991 |
| FR | 2634914 | 2/1990 |
| FR | 2664148 | 1/1992 |
| GB | 2061760 | 5/1981 |

* cited by examiner

*Primary Examiner*—Reginald L Alexander
(74) *Attorney, Agent, or Firm*—Thomas, Kayden, Horstemeyer & Risley, LLP

(57) ABSTRACT

A pressure cooking appliance with a bowl and lid therefor, a temperature sensor, a pressure regulating valve, and a steam outlet in communication with the valve. The temperature sensor is disposed in the vicinity of the valve to sense an increase in temperature from steam exiting the outlet for triggering a timer that signals the beginning of and counts down the cooking time.

13 Claims, 3 Drawing Sheets

APPLIANCE FOR COOKING FOODS UNDER PRESSURE COMPRISING A TEMPERATURE SENSOR

CROSS-REFERENCE TO RELATED APPLICATIONS

This application is a national stage application of International Application No. PCT/FR02/04534, filed Dec. 23, 2002, which claims priority to FR 01/17101, filed Dec. 27, 2001, both applications of which are hereby incorporated by reference in their entirety into the present application.

TECHNICAL FIELD

The present invention relates to the general technical field of household appliances for cooking under pressure, such an appliance comprising a bowl and a lid designed to be locked onto the bowl to form a leaktight cooking enclosure. Such an appliance serves to cook food contained in the bowl under steam pressure.

The present invention relates to an appliance for cooking food under pressure, the appliance being of the pressure cooker type and comprising: a bowl and a lid designed to be mounted on the bowl to form a leaktight cooking enclosure; a temperature sensor; and a pressure-regulating valve that is sensitive to the pressure prevailing inside the cooking enclosure and that is mounted to move between two stable abutment positions, namely a first position in which it shuts off communication from the enclosure to the outside so long as the internal pressure is lower than a predetermined pressure $P_0$, and a second position in which it puts the inside of the enclosure into communication with the outside via a steam outlet once the internal pressure reaches substantially the predetermined pressure $P_0$.

The present invention also relates to a method of monitoring a cooking cycle of a cooking appliance.

PRIOR ART

Attempts have already been made to obtain or retrieve information relating to magnitudes or parameters representative of the operating state of a pressure-cooking appliance for the purpose of controlling operation of said appliance or for monitoring operating safety.

Thus, it is already known that the cooking temperature of a pressure cooker or its operating pressure can be measured by means of sensors disposed inside the vessel itself, the information obtained serving to monitor the various cooking parameters of the appliance, such as the cooking time, the level of the cooking pressure, or the level of heat energy supplied for cooking the food. Such a method and such a device are described, for example, in Document GB-2 067 325.

It is also already known that a temperature sensor can be disposed on the lid of a pressure cooker in order to obtain an electrical signal, constituting an image of the cooking temperature, for the purpose of monitoring operation of the pressure cooker by means of an electronic processor device. The information obtained serves to give the user a series of visible or audible signals concerning the progress of a cooking cycle. Such a device is described in Patent Application FR-2 634 914.

Known devices are difficult to implement insofar as they require information to be gathered inside a leaktight enclosure, it then being necessary to transmit the information to a unit disposed outside the pressure cooker.

In addition, known devices also implement a series of electronic processor devices which are complex and often expensive.

It is also known that a timer can be used in association with a pressure cooker in order to monitor cooking time. In most cases, the timer is a unit that is separate from the appliance and that the user must start by taking positive action, since it is manually triggered.

In order to make such triggering automatic, it has already been proposed for such a timer to be started by the internal pressure of the cooking appliance being detected by means of a pressure sensor.

For the above-mentioned reasons, such a device is difficult to implement insofar as it requires information to be gathered from inside a cooking enclosure that is supposed to be leaktight.

Finally, consideration has already been given to triggering such timers automatically by detecting the movement of a pressure indicator by means of a Hall-effect probe. Such a device is also difficult to implement, expensive, and relatively inaccurate.

SUMMARY OF THE INVENTION

Objects of the invention are thus to remedy the various drawbacks listed above, and to provide a novel food-cooking appliance provided with the means necessary to enable the beginning of a cooking cycle for cooking food inside the pressure cooker to be detected simply and reliably.

Another object of the invention is to provide a novel cooking appliance making it possible to give the user reliable information concerning the beginning of the cooking cycle.

Another object of the invention is to provide a novel cooking appliance in which the temperature sensor is particularly easy to position.

Another object of the invention is to provide a novel pressure-cooking appliance which has improved features and which enables the user to monitor the cooking cycle effectively.

Another object of the invention is to provide a novel pressure-cooking appliance whose general design is simplified.

Objects of the invention are also to provide a novel method of monitoring a cooking cycle of a cooking appliance, which method is particularly effective, while also procuring very considerable freedom for the user.

The objects of the invention are achieved by means of an appliance for cooking food under pressure, the appliance comprising:
  a bowl and a lid designed to be mounted on the bowl to form a leaktight cooking enclosure;
  a temperature sensor; and
  a pressure-regulating valve that is sensitive to the pressure prevailing inside the cooking enclosure and that is mounted to move between two stable abutment positions, namely a first position in which it shuts off communication from the enclosure to the outside so long as the internal pressure is lower than a predetermined pressure $P_0$, and a second position in which it puts the inside of the enclosure into communication with the outside via a steam outlet once the internal pressure reaches substantially the predetermined pressures $P_0$;
  said appliance being characterized in that the temperature sensor is disposed in the vicinity of the outlet so as to make it possible to sense the increase in temperature resulting from the steam passing through the steam outlet, and is connected functionally to a timer so as to trigger it once the increase in temperature is sensed.

The objects of the invention are also achieved by means of a method of monitoring the cooking cycle of a pressure-cooking appliance, in which method the temperature of the jet of steam discharged by the pressure-regulating valve of the appliance is used to trigger automatically a timer mounted on the appliance.

BRIEF DESCRIPTION OF THE DRAWINGS

The objects and advantages of the invention appear in greater detail on reading the following description with reference to the accompanying drawings which are given by way of non-limiting illustrative example, and in which.

BEST MANNER OF IMPLEMENTING THE INVENTION

In the following description, reference is made to a household pressure-cooking appliance of the pressure cooker type which, in a manner known per Se, comprises a metal cooking bowl (not shown in the figures) and a lid 2 designed to be mounted on the bowl 1 to form a leaktight cooking enclosure. Leaktightness is obtained by locking the lid 2 to the bowl by means of a locking/unlocking system including an annular sealing gasket (not shown in the figures), thereby enabling the appliance to be brought up to pressure and the food contained in the appliance to be cooked.

The locking/unlocking systems for locking the lid 2 to the bowl and for unlocking said lid from said bowl may be of any known type, without limiting the invention, and may involve a system having a locking bar, a system having ramps on the bowl and on the lid, or else a system having radially-moving jaws or any other equivalent system.

The household pressure-cooking appliances concerned by the invention are thus pressure cookers locked by locking bars, bayonet fittings, jaws that move radially or otherwise, or "manhole-type" locking means, this list naturally being non-limiting.

The appliance of the invention for cooking food under pressure is also provided with a pressure-regulating valve 3 equipped with a sealing gasket 3A and preferably mounted on the lid 2, such a valve 3 being sensitive to the pressure prevailing in the cooking enclosure and being mounted to move between two stable abutment positions, namely a first position in which it shuts off communication from the enclosure to the outside of the appliance so long as the internal pressure is lower than a predetermined pressure $P_0$, and a second position in which it puts the inside of the enclosure into communication with the outside of the appliance via a steam outlet once the internal pressure reaches substantially the predetermined pressure $P_0$.

In a preferred variant of the invention, the pressure $P_0$ is chosen to be the normal cooking pressure of the pressure cooker.

Such devices are well known to the person skilled in the art, and they are designed to regulate the cooking pressure which must be kept below a predetermined threshold $P_0$, above which the valve 3 allows steam to escape, thereby regulating the internal pressure of the pressure cooker.

Figure 1:
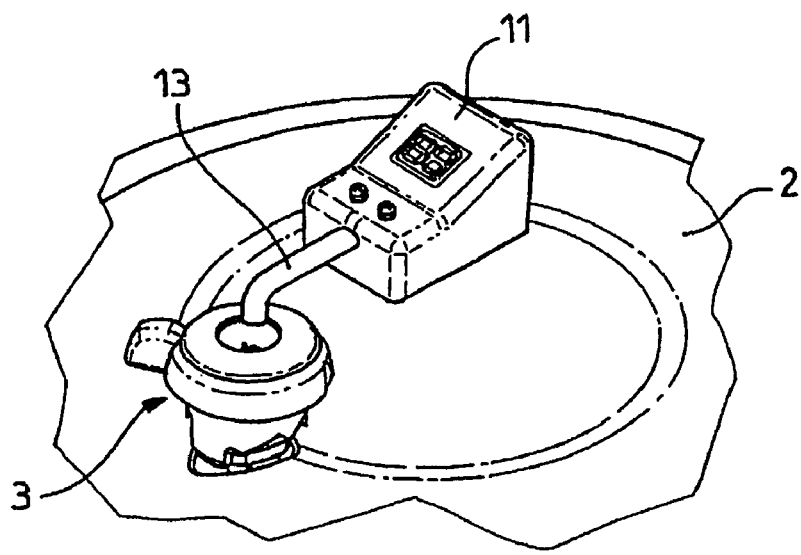
FIG. 1 is a fragmentary general perspective view of a pressure cooker of the invention.
Figure 2:
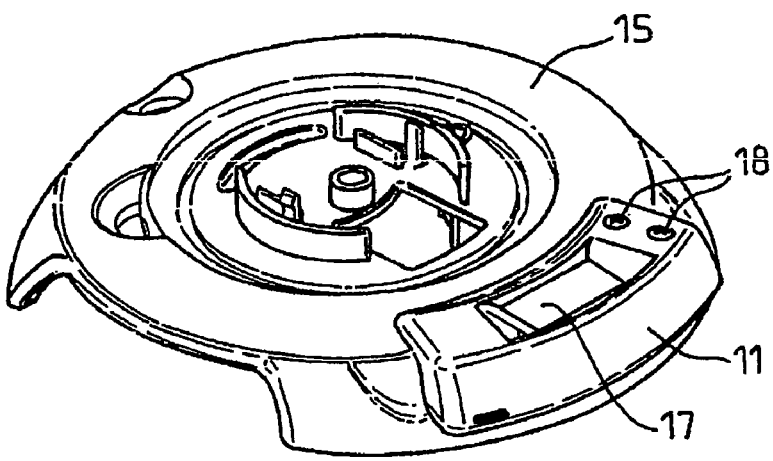
FIG. 2 is a fragmentary perspective view of a detail of an embodiment of a pressure cooker of the invention, including a removable timer.
Figure 3:
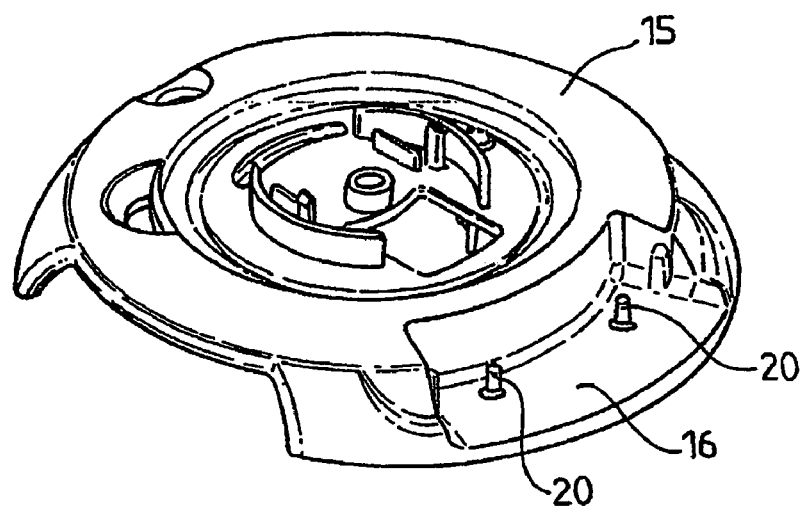
FIG. 3 is a view identical to the view of FIG. 2, showing a detail of an embodiment of a pressure cooker of the invention, with the timer removed.
Figure 4:
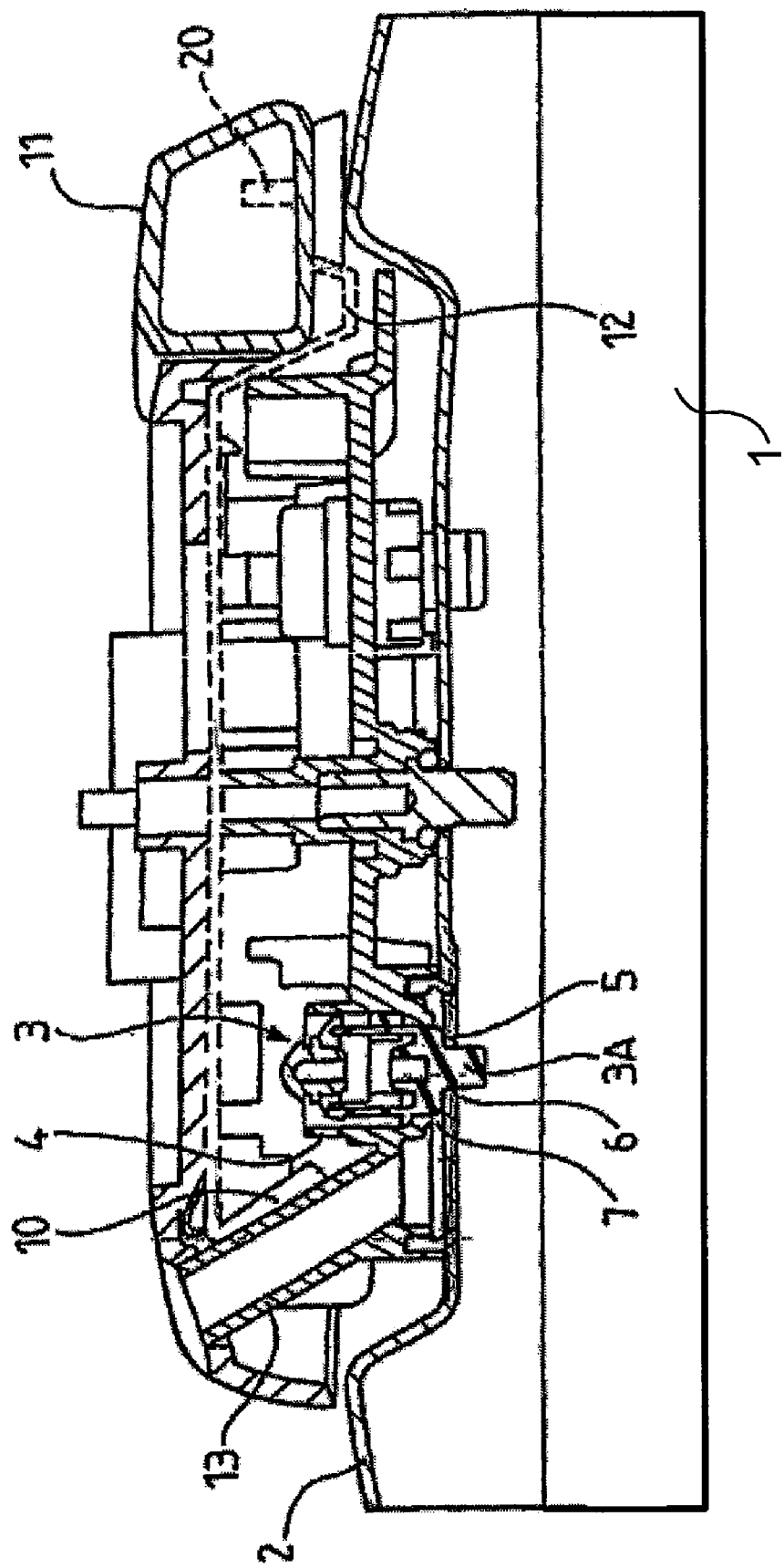
FIG. 4 is a fragmentary cross-section view, showing details of how a temperature sensor can be mounted on the lid of a pressure cooker of the invention.

As shown in FIGS. 1 and 4, for example, the valve 3 may advantageously be a valve loaded by a weight or by a compression spring and mounted to move in a well 4 from a stable abutment position shown in FIG. 4, and in which it rests under its own weight on a seat 5 provided through a bore 6 in the lid 2.

The valve 3 may also take up a high abutment position (not shown in the figures) under the effect of the internal operating pressure of the pressure cooker, when said pressure cooker reaches or exceeds the predetermined operating pressure $P_0$. In this position, the valve 3 is raised and opens up the orifice 5 through which the steam can escape to the outside through the bore 6 via a steam outlet 7, situated in the immediate or close vicinity of said bore.

As is well known to the person skilled in the art, the valve 3 may be provided with a calibration system enabling the user to select a predetermined cooking pressure $P_0$ from a range of two or more pressure levels as a function of the type of food present in the pressure cooker.

In the invention, the appliance for cooking food under pressure is provided with a temperature sensor 10 which is disposed in the vicinity of the outlet 7, so as to make it possible to sense the increase in temperature resulting from steam passing through the steam outlet 7.

This configuration makes it possible for information to be obtained particularly simply and reliably in real time indicating when the operating pressure, e.g. the cooking pressure, of the appliance is reached, since when the valve 3 lifts the steam is given off suddenly, causing the temperature also to rise suddenly and rapidly.

The temperature sensor 10 may be disposed in the immediate vicinity of the outlet 7 or at some distance, e.g. about a few centimeters, therefrom provided that the variation in temperature can be detected with sufficient clarity and sensitivity. The positioning distance may also advantageously be determined the person skilled in the art as a function of the sensitivity specific to the sensor 10 used.

As shown in the figures, the temperature sensor 10 is advantageously connected functionally to a timer 11 so as to trigger it once the increase in temperature has been sensed.

By means of this configuration, counting down the cooking time is then triggered automatically, without any action on the part of the user.

The sensor 10 used may advantageously be a negative temperature coefficient (NTC) type sensor functionally connected to the timer 11 via a suitable connection 12 and via processing electronics.

Advantageously, and as shown in the figures, the timer 11 and the temperature sensor 10 are mounted on the lid 2 of the pressure cooker.

Figure 5:
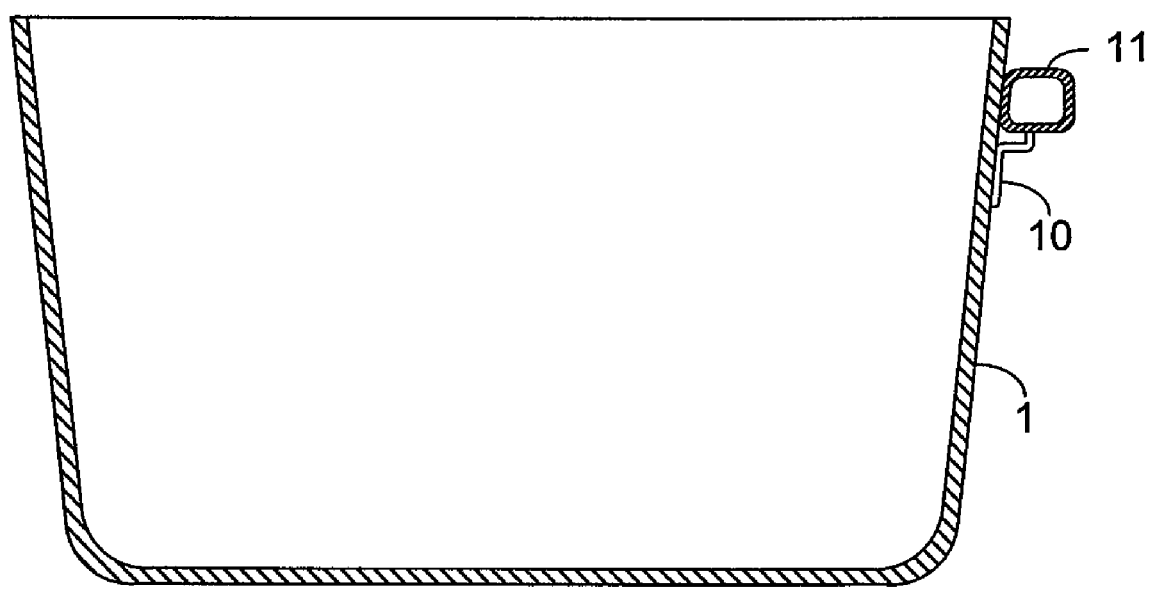
FIG. 5 is a fragmentary view showing an alternate embodiment with the timer and temperature sensor mounted on the bowl.

By way of a variant, it is naturally possible to consider positioning these two elements directly on or through the walls of the bowl, as shown in FIG. 5 by means of a suitable fitting, or fixing them to the bowl by means of the handles of the pressure cooker.

Advantageously, as shown in FIGS. 1 and 4, the steam outlet is formed by a duct 13 starting downstream from the valve 3 in the vicinity of the outlet 7 and leading to the outside of the appliance.

In this configuration, the temperature sensor 10 is mounted on the outside of the duct 13, e.g. in abutment against the outside surfaces of the walls of the duct 13. However, the sensor 10 may be mounted inside the duct 13 (FIG. 1).

In a particularly advantageous manner, the duct 13 and the temperature sensor 10 may be pre-fitted and be part of a one-piece unit directly integrated in a plate 15 designed to be put in place on the lid 2.

According to another characteristic of the invention, the timer 11 is advantageously a removable timer that users can thus extract from the pressure cooker in order to keep it nearby.

This feature makes it possible, once the timer 11 has been triggered automatically by means of the sensor 10 disposed in the pressure-regulating heat jet, for the user to extract the timer 11 and to monitor the progress of cooking time away from the appliance. At the same time, this enables the user to adjust the cooking parameters once the predetermined cooking pressure has been reached, while also retrieving the timer 11.

Advantageously, the pressure cooker is provided with a recess 16 for receiving the timer 11. In a variant, the recess 16 may also be provided in an independent plate 15.

The timer 11 is provided with a liquid crystal display (LCD) screen 17 for displaying information, in particular concerning temperatures and times, and with buttons 18 for setting various parameters, such as cooking time, for example.

The timer 11 is also provided with female connectors (not shown) serving to come into contact with male connectors 20 connected to the connection 12 and disposed in the recess 16 for establishing electrical connection with the sensor 10.

By way of a variant, the temperature sensor 10 may be connected to a unit other than a timer, and, for example, to a safety device, indicating, e.g. by sound, that a critical predetermined pressure or a critical predetermined temperature has been reached.

For operating purposes, the user locks the lid 2 on the bowl, and initiates the timer 11 by putting it in its alert position so that it can detect any rise in temperature.

When the timer is a conventional timer, the triggering threshold of the temperature sensor may, for example, be pre-set in the factory to a temperature of about 50° C., above which the sensor 10 sends a time count-down signal to the timer 11.

Once the timer 11 is in the alert position and once the pressure cooker is locked, temperature can begin to rise. Once the predetermined operating temperature for cooking is reached, the valve 3 discharges a jet of steam, thereby causing the temperature in the duct 13 to increase suddenly, the resulting increase in temperature being detected by the sensor 10. The sensor sends a temperature detection signal to the timer 11 which emits a signal, e.g. a sound signal, warning the user.

The user can then remove the timer 11, perform any operations, such as stopping the alarm, entering the required cooking time if the user has not already entered it into the timer, or changing the cooking time entered previously, etc., while taking the timer 11 away from the cooking appliance.

Subsequently, once the final cooking time pre-set by the user is reached, said user is warned again by the timer emitting a sound signal and/or by a flashing signal on the digital display 17.

Parameterizing the temperature detection may advantageously be improved by means of logic providing, for safety reasons, detection of a lower temperature threshold of 45° C., the logic containing the information necessary for systematically adding a constant value of 5° C., for example, to the measured temperature value, so as to be certain to detect the temperature of 50° C. which can then be validated by the user if desired, thereby triggering the timing count down.

In the same way, an upper temperature limit value, e.g. of about 75° C., may be pre-programmed to form a maximum threshold temperature above which the time count down is always validated and triggered.

The device of the invention therefore enables the beginning of cooking in a pressure cooker to be detected particularly reliably and safely, and independently of the pressure prevailing in the cooking enclosure.

The invention thus relates to a method of monitoring the cooking cycle of a pressure-cooking appliance of the pressure cooker type, optionally provided directly with heater elements, in which method the temperature of the jet of steam discharged from the pressure-regulating valve of the appliance is used to trigger a timer mounted on the appliance. The temperature of the jet of steam is used by using a suitable temperature sensor to detect the sudden rise in temperature that is generated by the steam suddenly being discharged once the operating pressure of the appliance is reached.

Simultaneously, or substantially simultaneously to triggering of the timer, said timer emits a warning signal, e.g. a light signal, a sound signal, or some other signal, for the purpose of warning the user that it has been triggered.

In the method of the invention for monitoring the cooking cycle, since the timer is removably mounted on the cooking appliance, said timer is dissociated or separated physically from the appliance, and the progress of the cooking is then monitored remotely from the appliance by consulting the timer, in particular visually.

By mounting the timer removably it is possible for the user to take the timer away as soon as or after it is triggered, and therefore to move away from the cooking appliance while said appliance is operating. This enables the user to monitor and to check the progress of the cooking remotely while in a location that is entirely separate from the appliance.

In this method, the timer then emits a warning signal indicating that the cooking cycle has finished, thereby enabling the user, who might be remote from the appliance, to return to it in order to stop the cooking, for example.

SUSCEPTIBILITY OF INDUSTRIAL APPLICATION

The invention can be applied industrially to manufacturing and designing pressure-cooking appliances.

The invention claimed is:

1. An appliance for cooking food under pressure, the appliance comprising:
   a bowl and a lid (2) designed to be mounted on the bowl to form a leaktight cooking enclosure;
   a temperature sensor (10); and
   a pressure-regulating valve (3) that is sensitive to the pressure prevailing inside the cooking enclosure and that is mounted to move between two stable abutment positions, namely a first position in which it shuts off communication from the enclosure to the outside so long as the internal pressure is lower than a predetermined pressure $P_0$, and a second position in which it puts the inside of the enclosure into communication with the outside via a steam outlet (7) once the internal pressure reaches substantially the predetermined pressure $P_0$;
   wherein the temperature sensor (10) is disposed in the vicinity of the outlet (7) so as to make it possible to sense the increase in temperature resulting from the steam passing through the steam outlet (7), and is connected functionally to a timer (11) so as to trigger it once the increase in temperature is sensed for beginning a countdown of the cooking time.

2. The appliance according to claim 1, wherein the timer (11) and the temperature sensor (10) are mounted on the bowl or on the lid (2).

3. The appliance according to claim 2, wherein the timer (11) is removable.

4. The appliance according to claim 1, wherein the timer (11) is connected functionally to the temperature sensor (10) via electrical connectors (20).

5. The appliance according to claim 1, wherein the steam outlet (7) is formed by a duct (13) starting downstream from the valve (3).

6. The appliance according to claim 5 wherein the temperature sensor (10) is mounted outside of the duct (13).

7. The appliance according to claim 6, wherein the temperature sensor (10) is mounted against the outside surface of the duct (13).

8. A timer serving to be used and mounted on the appliance according to claim 1.

9. A method of monitoring the cooking cycle of a pressure-cooking appliance, the method comprising:

sensing the temperature of a jet of steam discharged by a pressure-regulating valve of a pressure-cooking appliance; and using the temperature to automatically trigger a timer mounted on the pressure-cooking appliance for beginning a countdown of the cooking time;

removably mounting the timer on the appliance;

dissociating the timer from the appliance; and monitoring the progress of the cooking cycle remotely from the appliance by consulting the timer.

10. The method according to claim 9, wherein, simultaneously to being triggered, the timer emits a warning signal for warning the user.

11. The method according to claim 9, wherein the timer emits a warning signal at the end of the cooking cycle.

12. The method according to claim 10, wherein the warning signal is a light signal.

13. The method according to claim 10, wherein the warning signal is a sound signal.

* * * * *